United States Patent [19]

Takagi et al.

[11] Patent Number: 5,109,152

[45] Date of Patent: Apr. 28, 1992

[54] COMMUNICATION APPARATUS

[75] Inventors: Nobuya Takagi, Neyagawa, Japan; Mamoru Itoh, Baltimore, Md.

[73] Assignee: Matsushita Electric Industrial Co., Ltd., Osaka, Japan

[21] Appl. No.: 465,210

[22] PCT Filed: Jul. 13, 1989

[86] PCT No.: PCT/JP89/00706

§ 371 Date: Mar. 8, 1990

§ 102(e) Date: Mar. 8, 1990

[87] PCT Pub. No.: WO90/00781

PCT Pub. Date: Jan. 25, 1990

[30] Foreign Application Priority Data

| Jul. 13, 1988 | [JP] | Japan | 63-174521 |
| Jul. 21, 1988 | [JP] | Japan | 63-182324 |
| Jul. 21, 1988 | [JP] | Japan | 63-182328 |
| Aug. 4, 1988 | [JP] | Japan | 63-194988 |
| Aug. 5, 1988 | [JP] | Japan | 63-196542 |
| Aug. 5, 1988 | [JP] | Japan | 63-196544 |

[51] Int. Cl.$^5$ ............... G09C 1/00; G06K 19/07; G06K 17/00
[52] U.S. Cl. ............... 235/380; 235/379; 235/492; 380/23; 380/28; 340/825.34
[58] Field of Search ............... 235/379–382, 235/492; 380/20–28; 340/825.34

[56] References Cited

U.S. PATENT DOCUMENTS

| 4,650,975 | 3/1987 | Kitchener | 235/380 X |
| 4,710,613 | 12/1987 | Shigenaga | 235/380 |
| 4,751,732 | 6/1988 | Kamitake | 380/20 |
| 4,757,534 | 7/1988 | Matyas | 380/25 |
| 4,799,061 | 1/1989 | Abraham et al. | 340/825.34 |
| 4,804,825 | 2/1989 | Bitoh | 235/380 |
| 4,823,388 | 4/1989 | Mizutani et al. | 380/23 |
| 4,862,501 | 8/1989 | Kamitake et al. | 380/25 X |
| 4,961,142 | 10/1990 | Elliott et al. | 235/380 X |

FOREIGN PATENT DOCUMENTS

62-118472  5/1987  Japan.
63-688  1/1988  Japan.

*Primary Examiner*—Stuart S. Levy
*Assistant Examiner*—Joseph A. Rhoa
*Attorney, Agent, or Firm*—Stevens, Davis, Miller & Mosher

[57] ABSTRACT

This invention is intended for the communication between a first communication device (e.g., an IC card) and a second communication device (e.g., a card terminal) by preventing the faking of the IC card or card terminal, for example, thereby allowing correct information exchange between them. The invention provides the IC card with a first encryption means and the card terminal with a second encryption means. In consequence, communication signals in both directions are encrypted, and random numbers and the algorism of functional computation are prevented from being analyzed. As a result, manufacturing of fake devices can be prevented and correct information exchange can be performed.

9 Claims, 8 Drawing Sheets

COMMUNICATION APPARATUS

TECHNICAL FIELD

This invention relates to a communication apparatus which performs, between two communication devices, the confirmation of legitimacy of the communication partner and the implementation of confidentiality and recognition of transmitted messages.

BACKGROUND ART

Figure 9:
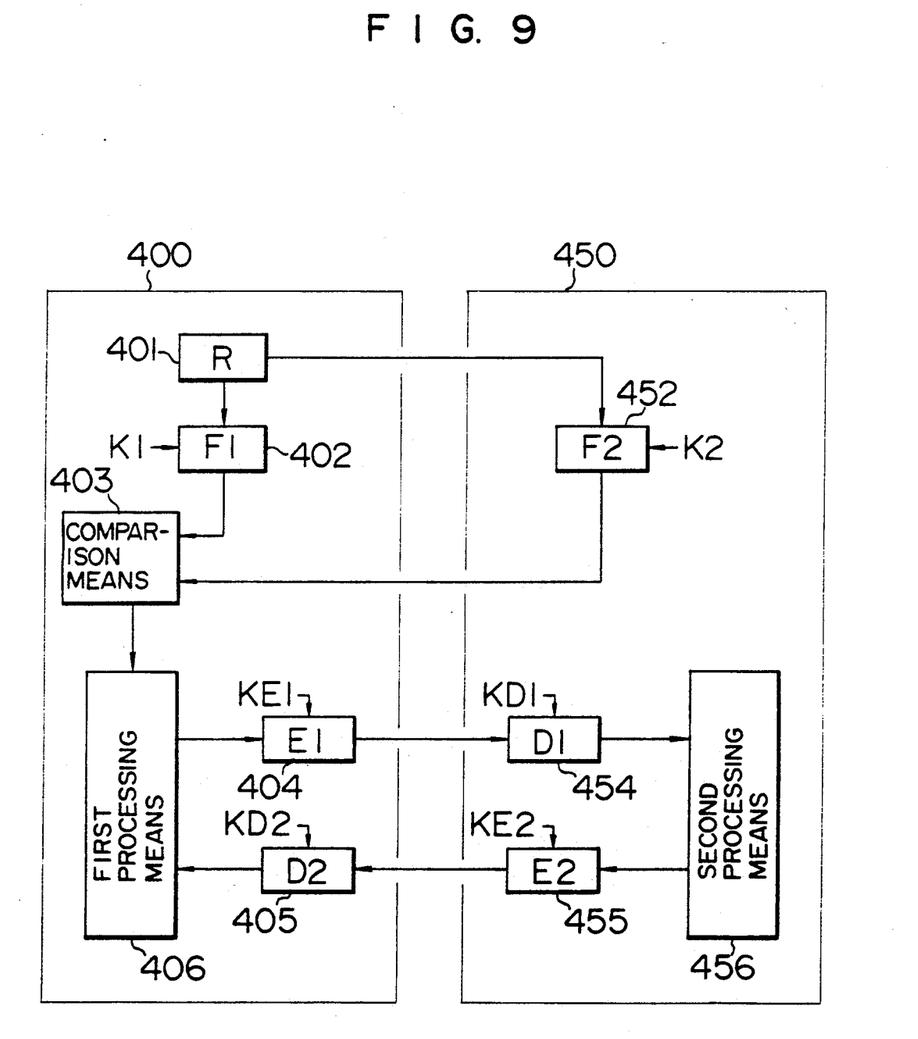
FIG. 9 is a block diagram showing the arrangement of a conventional IC card device.

FIG. 9 shows an IC card apparatus which is an example of the conventional communication apparatus, and shown in the case in which the first communication device is a card terminal and the second communication device is an IC card.

In FIG. 9, a card terminal 400 comprises a random number generation means 401 which generates a random number R, a first computation means 402 which performs a functional computation $F_1$ for first confidential data $K_1$ and the random number R provided by said random number generation means 401, comparison means 403 which compares data provided by said first computation means 402 and data entered from an IC card 450, first processing means 406 which performs such data processings as data input/output, storing and operation, first encryption means 404 which encrypts the data sent out from said first processing means by using a first encryption key $KE_1$, second decryption means 405 which decrypts encrypted data entered from the IC card 450 by using a second decryption key $KD_2$. The IC card 450 which exchanges information with the card terminal 400 comprises second computation means 452 which performs a functional computation $F_2$ for second confidential data $K_2$ and the random number R entered from the card terminal 400, second processing means 456 which performs such data processings as data input/output, storing and operation, first decryption means 454 which decrypts encrypted data entered from the card terminal 400 by using a first decryption key $KD_1$, and second encryption means 455 which encrypts the data sent out from said second processing means 456 by using a second encryption key $KE_2$.

The following explains the operation of the conventional IC card apparatus arranged as described above.

When the IC card 450 has been inserted in the card terminal 400, the card terminal 400 operates on the random number generation means 401 to generate a random number R and sends it to the IC card 450 in order to confirm the legitimacy of the IC card 450 (confirm that it is not a fake) before exchanging information. The random number R received by the IC card 450 is entered to the second computation means 452, and, after being performed the predetermined functional operation $F_2$ with the second confidential data $K_2$ which is stored in the IC card 450, sent to the card terminal 400 and entered to the comparison means 403 in the card terminal 400.

In the card terminal 400, similarly to the IC card 450, the random number R provided by the random number generation means 401 is entered to the first computation means 402, and, after being performed the predetermined functional operation $F_1$ with the first confidential data $K_1$ which is stored in the card terminal 400, entered to the comparison means 403. The first and second computation means 402 and 452 perform the same functional operation, and if the first and second confidential data are identical data, the two pieces of data entered to the comparison means 403 have the same value. The comparison means 403 compares the entered two pieces of data, and so far as both data match, the card terminal 400 judges that the IC card 450 is a legitimate IC card, and allows the first processing means 406 to exchange data with the IC card 450.

The first processing means 406, which has been granted the information exchange, sends the transmission data to the first encryption means 404, and the first encryption means 404 uses the first encryption key KE stored in the card terminal 400 to encrypt the entered transmission data and sends it to the IC card 450. The encrypted data received by the IC card 450 is entered to the first decryption means 454 and decrypted by use of the first decryption key $KD_1$ which is stored in the IC card 450, and is entered to the second processing means 456.

The second processing means 456 sends the transmission data to the second encryption means 455, and the second encryption means 455 uses the second encryption key $KE_2$ which is stored in the IC card 450 to encrypt it and sends it to the card terminal 400. The encrypted data received by the card terminal 400 is entered to the second decryption means 405 and decrypted by use of the second decryption key $KD_2$ which is stored in the card terminal 400, and is entered to the first processing means 406. In this manner, by repeating the encryption process and decryption process, information exchange takes place between the card terminal 400 and IC card 450.

In the foregoing conventional IC card apparatus, a first problem is that the IC card 450 cannot confirm the legitimacy of the card terminal 400. As regard to this problem, by the provision of the IC card 450 with a random number generation means and comparison means similar to those of the card terminal 400, it is possible for the IC card 450 to confirm the legitimacy of the card terminal 400 in the same manner as legitimacy confirmation for the IC card 450 by the card terminal 400, and the problem can readily be solved.

However, in the foregoing conventional IC card apparatus, the random number R generated for the confirmation of legitimacy of the IC card 450 by the card terminal 400 and the result $F_2(R, K_2)$ of computation for the random number R by the computation means 452 appears each time in the interface section between the card terminal 400 and IC card 450, allowing the third person to readily know the random number R and the computation result $F_2(R, K_2)$, and in the event of a leakage of the algorism of functional operation, the confidential data can be analyzed and the IC card 450 can be faked.

For the information exchange, communication takes place between the card terminal 400 and IC card 450 while performing the encryption process and decryption process for the information to be exchanged by use of the encryption key and decryption key which have been stored in advance in the card terminal 400 and IC card 450, and therefore if the same encryption algorism and same keys are used in the encryption process and decryption process for a long period of time, the cryptograph can be analyzed and communication information can be leaked.

In order to solve these problems, the confidential data and the encryption key and decryption key stored in both of the card terminal 400 and IC card 450 need to be changed frequently, however, since IC card 450 is possessed by many unspecified users in many cases, it is virtually difficult to change the confidential data and the encryption key and decryption key in practice.

DISCLOSURE OF INVENTION

This invention is intended to cope with the foregoing problems, and its object is to provide a communication apparatus which is capable of preventing the faking by analysis of the confidential data and the encryption key and decryption key without the need of their frequent changes thereby to perform correct information exchange. In order to achieve this objective, this invention is designed to include a first communication device and a second communication device which performs communication with the first communication device, and the first communication device comprises random number generation means which generates a random number, first encryption means which encrypts the random number provided by the random number generation means, second decryption means which decrypts data entered from the second communication device, comparison means which compares the random number provided by the random number generation means with data provided by the second decryption means, first processing means which performs such data processings as data input/output, storing and operation, and first communication means which processes data provided by the first processing means by using the random number provided by the random number generation means and thereafter sends it to the second communication device, or receives and processes data entered from the second communication device by using the random number provided by the random number generation means and thereafter enters it to the first processing means, and the second communication device comprises first decryption means which decrypts encrypted data entered from the first communication device, second encryption means which encrypts data provided by the first decryption means, second processing means which performs such data processings as data input/output, storing and operation, and second communication means which processes data provided by the second processing means by using the data provided by the first decryption means and thereafter sents it to the first communication device, or receives and processes data entered from the first communication device by using the data provided by the first decryption means and thereafter enters it to the second processing means. In the foregoing arrangement, when the first communication means (e.g., an IC card; it will be termed IC card hereinafter) is connected with the second communication means (e.g., a card terminal; it will be termed card terminal hereinafter), the random number generation means within the IC card generates random number data, and the first encryption means encrypts the random number provided by the random number generation means by using a first encryption key $KE_1$ which is stored in advance in the IC card and sends it to the card terminal. The first decryption means within the card terminal decrypts the received encrypted data with a first decryption key $KD_1$ which is stored in advance in the card terminal thereby to get the same random number data as the random number which has been generated in the IC card. The second encryption means in the card terminal encrypts once again the decrypted random number with a second encryption key $KE_2$ which is stored in advance in the card terminal and sends it to the IC card, and the second decryption means in the IC card decrypts the encrypted data with a second decryption key $KD_2$ which is stored in advance in the IC card and enters it to the comparison means. The comparison means compares the random number data generated in the IC card with the random number data received from the card terminal, and, if both data match, the IC card judges that the card terminal is a legitimate terminal and grants the first processing means to have the information exchange with the card terminal.

The first processing means which has been granted the information exchange sends the transmission data to the first communication means, and the first communication means 1 uses the random number data provided by the random number generation means to encrypt the entered transmission data and sends it to the card terminal. The encrypted data received by the card terminal is entered to the second communication means, and the second communication means uses the random number data received from the IC card to decrypt the entered encrypted data and enters it to the second processing means.

The second processing means sends the transmission data to the second communication means, and the second communication means uses the random number data received from the IC card to encrypt the entered data and sends it to the IC card. The encrypted data received by the IC card is entered to the first communication means, and the first communication means uses the random number data provided by the random number generation means to decrypt the entered encrypted data and enters it to the first processing means.

Through the repetition of the foregoing processes, the IC card performs the information encryption process and decryption process by using the random number data generated in the IC card for the encryption key and decryption key, and the card terminal performs the information encryption process and decryption process by using the random number data, which is obtained by decrypting the encrypted random number data received from the IC card, for the encryption key and decryption key, thereby performing the information exchange based on the cryptograph between the IC card and card terminal.

Namely, according to this invention, the first communication device (e.g., an IC card) is provided with random number generation means and first encryption means, and the second communication device (e.g., a card terminal) is provided with second encryption means, and therefore a random number flowing from the first communication device to the second communication device is encrypted by the first encryption means, and a random number flowing form the second communication device to the first communication device is encrypted by the second encryption means.

Consequently, the random number and the algorism of functional operation are prevented from being analyzed, and therefore the first and second communication devices are prevented from being faked, whereby the correct information exchange can take place between the first and second communication devices.

BEST MODE FOR CARRYING OUT THE INVENTION

The following explains embodiments of this invention using the drawings

Embodiment 1

Figure 1:
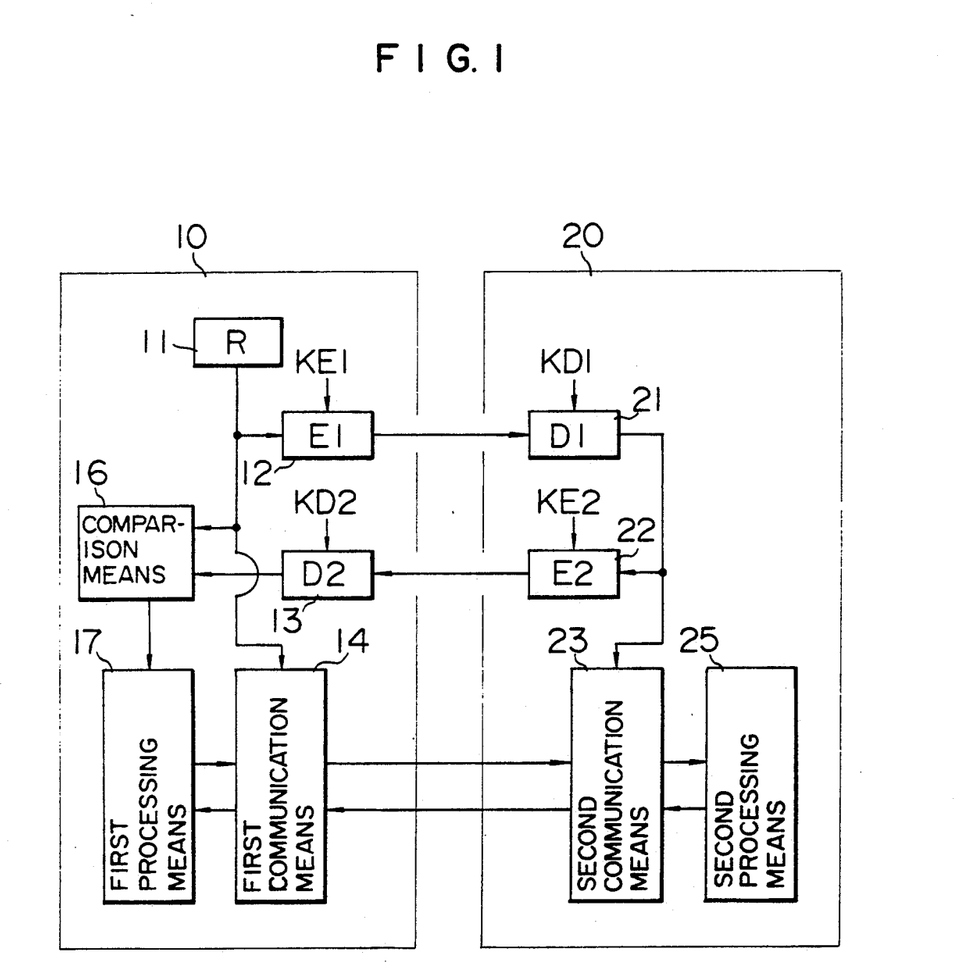
FIG. 1, FIG. 3 and FIG. 4 are block diagrams each showing the arrangement of the communication apparatus according to an embodiment of this invention.

FIG. 1 is a block diagram showing the first embodiment of the inventive communication apparatus.

In FIG. 1, 11 is a random number generation means which generates random number data, and 12 is a first encryption means which encrypts random number data provided by the random number generation means 11 by using a first encryption key $KE_1$ which is stored in advance in an IC card 10. 13 is a second decryption means which decrypts encrypted data entered from a card terminal 20 by using a second decryption key $KD_2$ which is stored in advance in the IC card 10, and 16 is a comparison means which compares the random number data provided by the random number generation mean 11 with the data provided by the second decryption means 13. 17 is a first processing means which performs such data processings as data input/output, storing and operation for the IC card 10, and 14 is a first communication means which encrypts or decrypts the data produced by the first processing means 17 by using the random number data provided by the random number generation means 11. 21 is a first decryption means which decrypts encrypted data entered from the IC card 10 by using a first decryption key $KD_1$ which is stored in advance in the card terminal 20. 22 is a second encryption means which encrypts the decrypted random number data provided by the first decryption means 21 by using a second encryption key $KE_2$ which is stored in advance the card terminal 20. 25 is a second processing means which performs such processings as data input/output, storing and operation for the card terminal 20, and 23 is a second communication means which decrypts or encrypts encrypted data entered from the IC card 10 by using the decrypted random number data provided by the first decryption means 21.

The following describes in brief the operation of the communication apparatus arranged as described above.

When the IC card 10 is inserted in the card terminal 20, the random number generation means 11 in the IC card 10 generates random number data, and the first encryption means 12 encrypts the random number data provided by the random number generation means 11 by using the first encryption key $KE_1$ which is stored in advance in the IC card 10, and sends it to the cards terminal 20. The first decryption means 21 in the card terminal 20 decrypts the received encrypted data with the first decryption key $KD_1$ which is stored in advance in the card terminal 20 thereby to obtain random number data which is identical to the random number data generated in the IC card 10 The second encryption means 22 encrypts the decrypted random number data once again with the second encryption key $KE_2$ which is stored in advance in the card terminal 20, and sends it to the IC card 10, and the second decryption means 13 decrypts the encrypted data by using the second decryption key $KD_2$ which is stored in advance in the IC card 10, and enters it to the comparison means 16. The comparison means 16 compares the random number data generated in the IC card 10 with the random number data received from the card terminal 20, and, if both data match, the IC card 10 judges that the card terminal 20 is a legitimate terminal, granting the first processing means 17 to have the information exchange with the card terminal 20.

The first processing means 17, which has been granted the information exchange, sends the transmission data to the first communication means 14, and the first communication means 14 encrypts the entered transmission data by using the random number data provided by the random number generation means 11 and sends it to the card terminal 20. The encrypted data received by the card terminal 20 is entered to the second communication means 23, which then decrypts the entered encrypted data by using the random number data received from the IC card 10 and sends it to the second processing means 25.

The second processing means 25 sends the transmission data to the second communication means 23, and the second communication means 24 encrypts the entered data by using the random number data received from the IC card 10 and sends it to the IC card 10. The encrypted data received by the IC card 10 is entered to the first communication means 14, which decrypts the entered encrypted data by using the random number data provided by the random number generation means 11 and enters it to the first processing unit 17.

Through the repetition of the foregoing processes, the IC card 10 performs the information encryption process and decryption process by using the random number data generated in the IC card 10 for the encryption key and decryption key, and the card terminal 20 performs the information encryption process and decryption process by using the random number data, which is obtained by decrypting the encrypted random number data received from the IC card 10, thereby performing the cryptographic information exchange between the IC card 10 and the card terminal 20.

Figure 2:
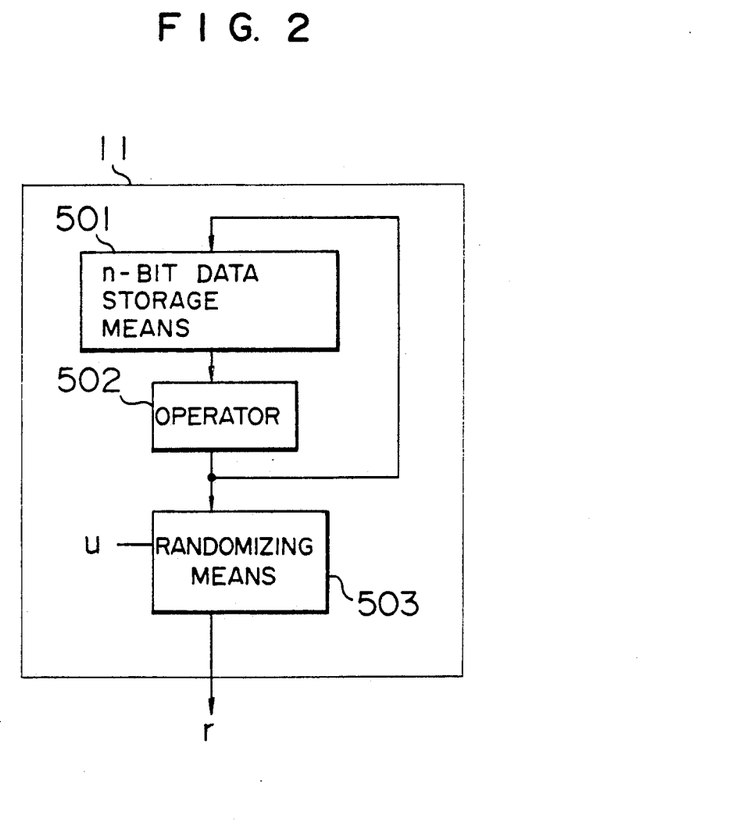
FIG. 2 is a block diagram showing the arrangement of the random number generation means according to an embodiment of this invention.

In this situation, the random number generation means 11 can be configured as shown in FIG. 2, for example. In FIG. 2, 501 is a means of storing n-bit data, 502 is an operator which receives n-bit data and produces n-bit data, and 503 is a randomizing means. Here, n is a unit of encryption by the first encryption means and the second encryption means The n-bit data storage means 501 is formed of such a rewritable nonvolatile memory as EEPROM.

The following explains the operation of the random number generation means 11 with reference to FIG. 2. Initially, the operator 502 performs a computation for the input data stored in the n-bit data storage means 501 thereby to produce n-bit data to be entered to the randomizing means 503. The n-bit data is fed back and stored in the n-bit data storage means 501 so that it is an input for the subsequent computation by the operator 502. The randomizing means 503 performs a computation for the first input which is a value u specific to the IC card 10 and the second input which is the n-bit data produced by the operator 502 thereby to provide a random number r. Even though the operator 502 performs such a simple computation as addition, the output, i.e., the random number r, produced by the randomizing means 503 takes a value which is sufficiently random so far as the computation output has a sufficiently large number of digits and a sufficiently long period. Since the first input u to the randomizing means 503 has a value specific to the IC card 10, the output of the randomizing means 503 has no correlation among a plurality of IC cards. Accordingly, even if an ill-willing third person has acquired the cycle of random numbers of one IC card, the person cannot use it for other IC cards.

Moreover, in this embodiment, by using the same cryptographic function for the first encryption means 12, second encryption means 22 and randomizing means 503, the number of component parts (or the size of program) can be reduced.

In addition, those that need to be confidential in the card terminal 20 (e.g., encryption key, etc.) are preferably stored in a physically safe second IC card (not shown).

Embodiment 2

Figure 3:
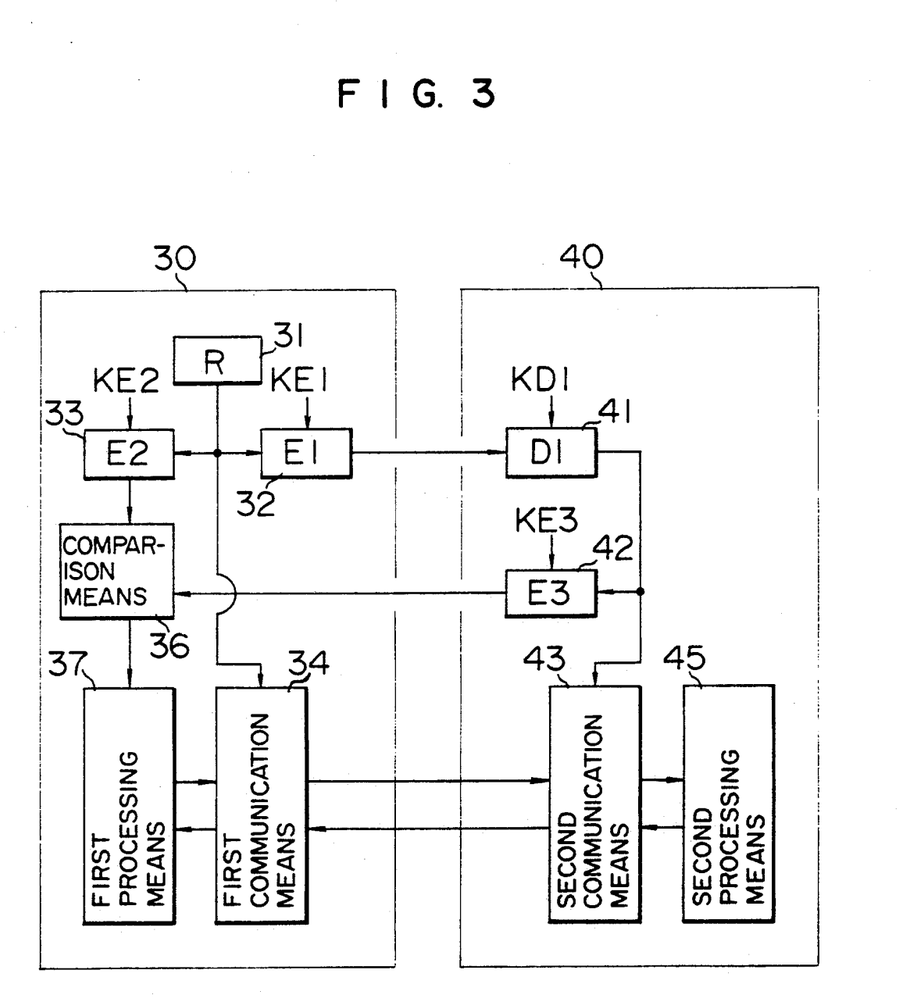

FIG. 3 is a block diagram showing the second embodiment of the inventive communication apparatus.

In FIG. 3, 31 is a random number generation means which generates random number data, and 32 is a first encryption means which encrypts the random number data provided by the random number generation means 31 by using a first encryption key $KE_1$ which is stored in advance in an IC card 30. 33 is a second encryption means which encrypts the data provided by the random number generation means 31 by using a second encryption key $KE_2$ which is stored in advance in the IC card 30. 36 is a comparison means which compares the random number data provided by the random number generation means 31 with the encrypted data received from a card terminal 40, and 37 is a first processing unit which performs such data processings as data input/output, storing and operation for the IC card 30.

The first processing means 37, first communication means 34, second processing means 45 and second communication means 43 are for exchanging information between the IC card 30 and the card terminal 40 by using cryptographs, and they are arranged completely identically to the first embodiment The following describes in brief the operation of the IC card apparatus arranged as described above When the IC card 30 is inserted in the card terminal 40, the random number generation means 31 in the IC card 30 generates random number data, and the first encryption means 32 encrypts the random number data provided by the random number generation means 31 by using the first encryption key $KE_1$ which is stored in advanced in the IC card 30, and sends it to the card terminal 40. The first decryption means 41 in the card terminal 40 decrypts the received encrypted data with the first decryption key $KD_1$ which is stored in advance in the card terminal 40 thereby to obtain random number data which is identical to the random number data generated in the IC card 30. A third encryption means 42 encrypts the decrypted random number data once again with a third encryption key $KE_3$ which is stored in advance in the card terminal 40 and sends it to the IC card 30, and the IC card 30 enters the encrypted data received from the card terminal 40 to the comparison means 36. The second encryption means 33 in the IC card 30 encrypts the random number data provided by the random number generation means 31 by using the second encryption key $KE_2$ which is stored in advance in the IC card 30 and enters it to the comparison means 36. The comparison means 36 compares the data provided by the second encryption means 33 with the encrypted data received from the card terminal 40, and, if both data match, the IC card 30 judges that the card terminal 40 is a legitimate terminal, granting the first processing means 37 to have the information exchange with the card terminal 40.

By being granted the information exchange, the IC card 30 performs the information encryption process and decryption process by using the random number data generated in the IC card 30 for the encryption key and decryption key, and the card terminal 40 performs the information encryption process and decryption process by using the random number data, which has been obtained by decrypting the encrypted random number data received from the IC card 30, for the encryption key and decryption key, thereby performing the cryptographic information exchange between the IC card 30 and the card terminal 40.

In this situation, the random number generation means 31 can be configured as shown in FIG. 2 as in the first embodiment.

Further, in this embodiment, by using the same cryptographic function for the first encryption means 32 and second encryption means 33, the number of component parts (or the size of program) can be reduced.

In addition, those that need to be confidential in the card terminal 40 (e.g., encryption key, etc.) are preferably stored in a physically safe second IC card (not shown).

Embodiment 3

Figure 4:
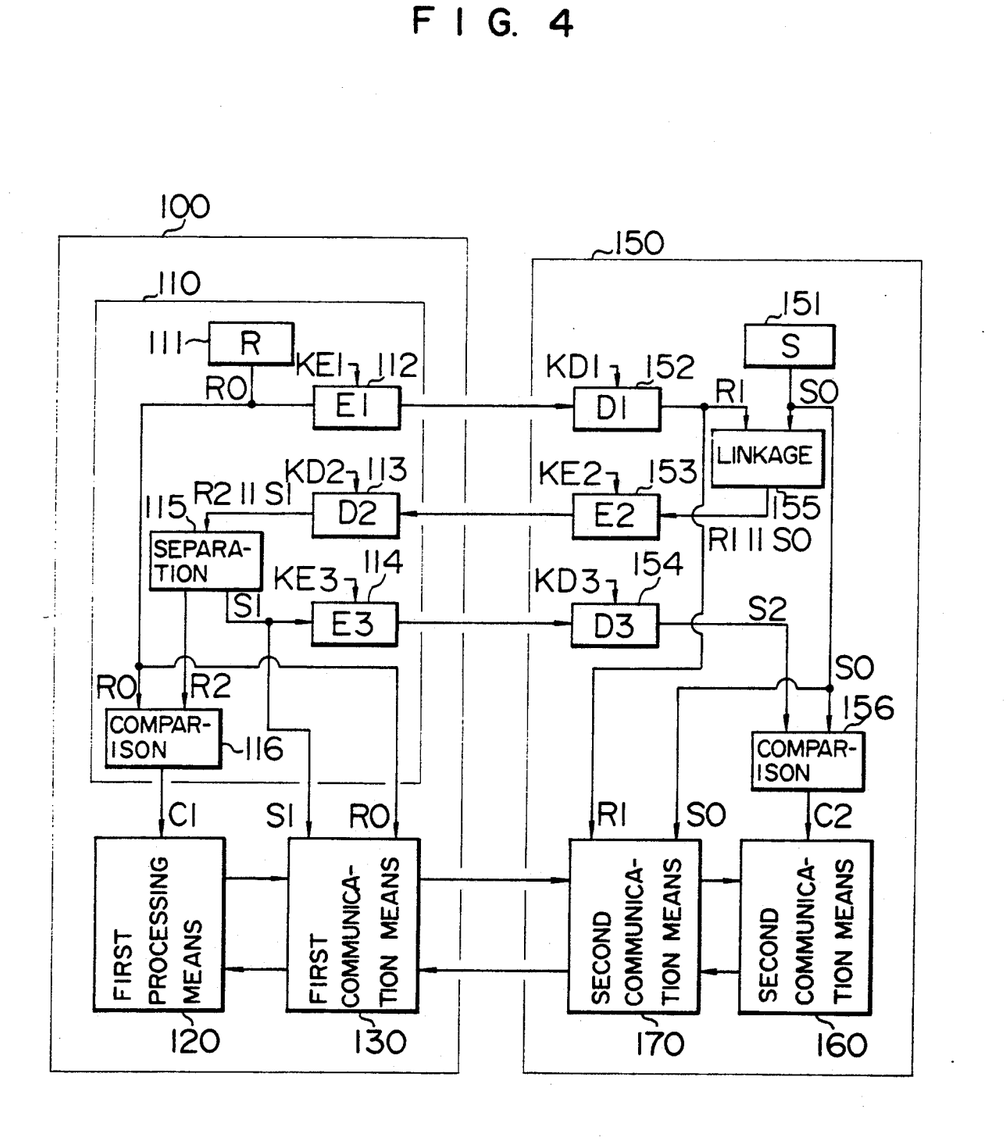

FIG. 4 is a block diagram showing the third embodiment of the inventive communication apparatus.

In FIG. 4, 110 is a confirmation IC card which is equipped in a card terminal 100 for confirming the legitimacy of a transaction IC card 150. 111 is a first random number generation means which generates random number data $R_0$, and 112 is a first encryption means which encrypts the random number data provided by the first random number generation means 111 by using a first encryption key $KE_1$ which is stored in the confirmation IC card 110. 113 is a second decryption means which decrypts encrypted data entered from the outside by using a second decryption key $KD_2$ which is stored in the confirmation IC card 110, and 115 is a data separation means which separates the data provided by the second decryption means 113 into first data $R_2$ and second data $S_1$. 114 is a third encryption means which encrypts the second data $S_1$ provided by the data separation means 115 by using a third encryption key $KE_3$ which is stored in the confirmation IC card 110. 116 is a first comparison means which compares the random number data $R_0$ provided by the first random number generation means 111 with the first data R provided by the data separation means 115. 120 is a first processing means which performs such data processings as data input/output, storing and operation. 130 is a first communication means which encrypts data sent out of the first processing means 120 by using the second data $S_1$ provided by the data separation means 115 and the random number data $R_0$ provided by the first random number generation means 111, and decrypts encrypted data entered from the outside, and these parts constitutes the card terminal 100. The first random number generation means 111, first encryption means 112, second decryption means, third encryption means 114, data separation means 115, and first comparison means 116 are configured within the confirmation IC card 110, and they function as a part of the card terminal 100.

151 is a second random number generation means which generates random number data $S_0$, and 152 is a first decryption means which decrypts encrypted data entered from the outside by using a first decryption key $KD_1$ which is stored in the transaction IC card 150. 155 is a data linkage means which links the random number data $S_0$ provided by the second random number generation means 151 and the data $R_1$ provided by the first decryption means 152, and 151 is a second encryption means which encrypts the linked data provided by the data linkage means 155 by using a second encryption key $KE_2$ stored in the transaction IC card 150. 154 is a third decryption means which decrypts encrypted data entered from the outside by using a third decryption key $KD_3$ stored in the transaction IC card 150, and 156 is a second comparison means which compares the random number data $S_0$ provided by the second random number data generation means 151 with the data $S_2$ provided by the third decryption means 154. 160 is a second processing means which performs such data processings as data input/output, storing and operation, 170 is a second communication means which decrypts encrypted data entered from the outside and encrypts data sent out of the second processing means 160, by using the data $R_1$ provided by the first decryption means 152 and the random number data $S_0$ provided by the second random number generation means 151 and these parts constitutes the transaction IC card 150. The following explains the operation of the IC card apparatus arranged as described above.

Initially, when the transaction IC card 150 is inserted in the card terminal 100 which is equipped with the confirmation IC card 110, the first random number generation means 111 in the confirmation IC card 110 generates random number data $R_0$, and the first encryption means 112 encrypts the random number data $R_0$ provided by the first random number generation means 111 by using the first encryption key $KE_1$ which is stored in advance in the confirmation IC card 110, and sends it to the transaction IC card 150. The first decryption means 152 in the transaction IC card 150 decrypts the received encrypted data with the first decryption key $KD_1$ which is stored in advance in the transaction IC card 150 thereby to obtain random number data $R_1$ which is inferred to be identical to the random number data $R_0$ generated by the confirmation IC card 110.

Next, also on the part of the transaction IC card 150, the second random number generation means 151 generates random number data $S_0$, and the data linkage means 155 performs the linkage process for the random number data $S_0$ provided by the second random number generation means 151 and the random number data $R_1$ provided by the first decryption means 152 thereby to produce linked data $R_1 \| S_0$. Here, the symbol " $\|$ " denotes the linkage of two pieces of data. The second encryption means 153 encrypts the linked data $R_1 \pm S_0$ by using the second encryption key $KE_2$ which is stored in advance in the transaction IC card 150, and sends it to the card terminal 100.

The second decryption means 113 decrypts the encrypted data received by the card terminal 100 with the second decryption key $KD_2$ which is stored in advance in the confirmation IC card 110 thereby to obtain linked data $R_2 \| S_1$ which is inferred to have been produced by the transaction IC card 150. The data separation mean 115 separates the linked data into two pieces of random number data $R_2$ and $S_1$, and the third encryption means 114 encrypts the random number data $S_1$ which is inferred to have been produced by the transaction IC card 150 with the third encryption key $KE_3$ which is stored in advance in the confirmation IC card 110 and sends it to the transaction IC card 150, and the first comparison means 116 compares in value the random number data $R_2$ which is inferred to have been produced by the confirmation IC card 110 with the random number data $R_0$ which has been actually generated by the first random number generation means 111.

The third decryption means 154 decrypts the encrypted data received by the transaction IC card 150 by using the third decryption key $KD_3$ which is stored in advance in the transaction IC card 150, and the second comparison means 156 compares in value the random number data $S_2$ which is inferred to have been produced by the transaction IC card 150 with the random number data $S_0$ which has been actually generated by the second random number generation means 151.

In the first comparison means 116, the result of comparison between the random number data $R_2$ which is inferred to have been produced by the confirmation IC card 110 and the random number data $R_0$ which has been actually provided by the first random number generation means 111 becomes a first control signal $C_1$ for the first processing means 120. If both data match, the first comparison means 116 grants the first processing means 120 to have the information exchange with the transaction IC card 150, or inhibits the information exchange if the data do not match. Similarly, in the second comparison means 156, the result of comparison between the random number data $S_2$ which is inferred to have been produced by the transaction IC card 150 and the random number data $S_0$ which has been actually generated by the second random number generation means 151 becomes a second control signal $C_2$ for the second processing means 160, and only if both data match, it grants the second processing means 160 to have the information exchange.

By being granted the information exchange, the first processing means 120 sends the transmission data to the first communication means 130, which encrypts the entered transmission data by using the random number data $S_1$ provided by the data separation means 115 and the random number data $R_0$ provided by the first random number generation means 111, and sends it to the transaction IC card 150. The encrypted data received by the transaction IC card 150 is entered to the second communication means 170, which decrypts it by using the random number data $R_1$ provided by the first encryption means 152 and the random number data $S_0$ provided by the second random number generation means 151, and it is entered to the second processing means 160.

Similarly, the second processing means 160 which has been granted the information exchange sends the transmission data to the second communication means 170, which encrypts the entered transmission data by using the random number data $R_1$ provided by the first decryption means 152 and the random number data $S_0$ provided by the second random number generation means 151 and sends it to the card terminal 100. The encrypted data received by the card terminal 100 is entered to the first communication means 130, which decrypts it by using the random number data $S_1$ provided by the data separation means 115 and the random number data $R_0$ provided by the first random number generation means 111 and entered it to the first processing means 120.

In this manner, the encryption process and decryption process are repeated by using two pieces of random number data produced by the confirmation IC card 110 and transaction IC card 150, respectively, and exchanged confidentially, and information can be exchanged safely between the card terminal 100 and the transaction IC card 150.

Here, the random number generation means 111 can be configured as shown in FIG. 2, for example, as in the first embodiment.

Moreover, in this embodiment, by using the same cryptographic function for the first encryption means 112, second encryption means 153 and third encryption means 114, the number of component parts (or the size of program) can be reduced.

Embodiment 4

Figure 5:
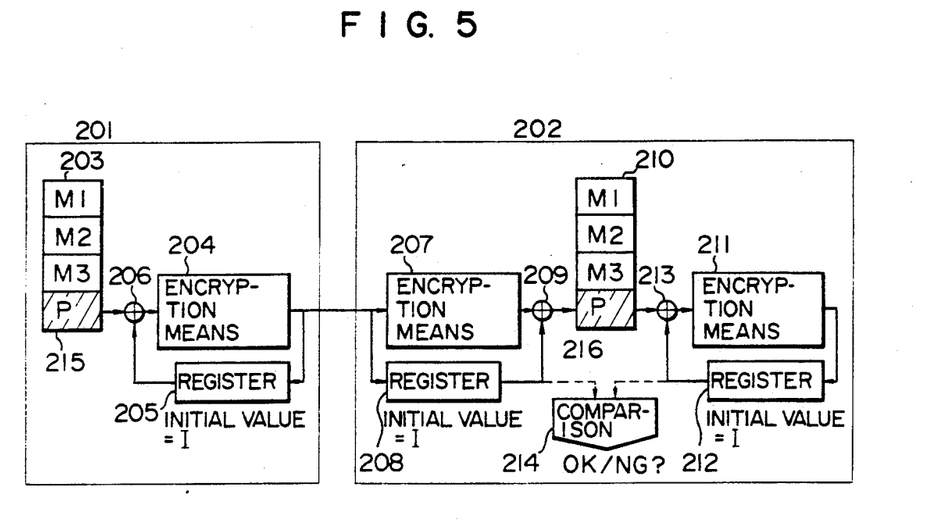
FIGS. 5 and 7 are block diagrams each showing the arrangement of the communication means according to an embodiment of this invention.

FIG. 5 is a block diagram of the first and second communication means according to an embodiment of this invention. In FIG. 5, 201 is a first device which performs data transmission, and 202 is a second device which performs data reception, and in an IC card apparatus the first device 201 is a terminal and the second device 202 is an IC card, although they will be termed first and second devices in the following explanation. 203 is a plain text block storage means, 204 is a first encryption means which enters n-bit data and delivers n-bit data, 205 is a first register, 206 is a first exclusive-OR operation means, 207 is a decryption means which corresponds to the first encryption means 204, 208 is a second register, 209 is a second exclusive-OR operation means, 210 is a restoration block storage means, 211 is a second encryption means which performs the same operation as of the first encryption means 204, 212 is a third register, 213 is a third exclusive-OR operation means, 214 is a comparison means, and 215 and 216 are an n-bit fixed pattern (P) possessed commonly by the first device 201 and second device 202.

The following explains this embodiment with reference to FIG. 5. As the initial state, a same value I is stored in the first, second and third registers 205, 208 and 212. For the I, a random number shared confidentially by the first and second communication devices in the first through third embodiments can be used, for example. The first device 201 divides the plain text block stored in the plain text block storage means 203 into strings of n-bit that is the unit of encryption. The resulting n-bit data strings will be termed $M_1$, $M_2$ and $M_3$ (the fixed pattern (P) 215 will be described later). The leading n-bit data $M_1$ is delivered to the first exclusive-OR operation means 206. The first exclusive-OR operation means 206 computes the exclusive-OR between the n-bit data $M_1$ and the data (initial value I) in the first register, and delivers it to the encryption means 204. The encryption means 204 implements the encryption process for the input from the first exclusive-OR operation means 206, and sends it to the second device 202. For the encryption key in this operation, a random number shared confidentially by the first and second communication devices in the first through third embodiments can be used, for example. Provided that the disorderliness of the encryption means 204 is sufficient, it is very difficult for a third person who does not have the decryption means 207 to obtain the plain text $M_1$ from the communication data (cipher text). In this manner, the implementation of message confidentiality is made possible.

The second device 202 restores the plain text $M_1$ from the reception data (cipher text) in the following manner. The second device 202 uses the decryption means 207 to perform the decryption process for the received data, and delivers the result to the second exclusive-OR operation means 209. The second exclusive-OR operation means 209 computes the exclusive-OR between the input from the decryption means 207 and the data (initial value I) in the second register, and stores the result $M_1'$ in the restoration block storage means 210. After that, the first device 201 stores the output (i.e., transmission data) of the first encryption means 204 in the first register 205 in place of the initial value I. Similarly, the second device 202 stores the reception data from the first device 201 in the second register 208. Accordingly, unless the transmission data is altered accidentally or intentionally, the first register 205 and second register 208 always stores the same value. By repeating the process of the leading n-bit data $M_1$ for the $M_2$ and $M_3$ identically, the restored original data are stored sequentially in the restoration block storage means 210. This cryptograph-based mode is known generally as CBC mode, and since the content of preceding data affects the encryption output of successive data, it provides such effectiveness as a different output of the first encryption means 204 even for the same transmission data $M_1$, $M_2$ and $M_3$ by changing the initial value I of the first register 205.

Figure 6:
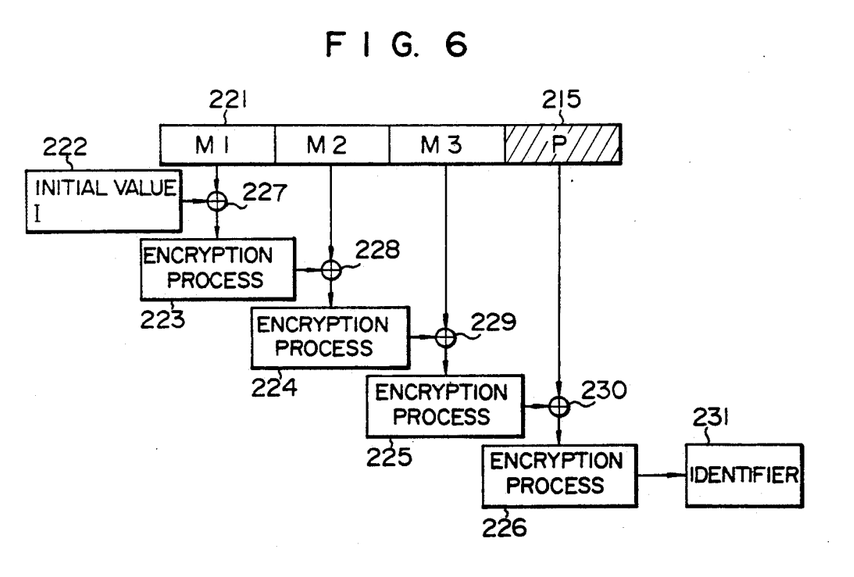
FIGS. 6 and 8 are explanatory diagrams each showing the procedure of generating the identifier according to the embodiment of this invention.

Next, a method of creating the identifier will be explained with reference to FIG. 6. FIG. 6 is an explanatory diagram showing the procedure of creating the identifier, in which 221 is a plain text block ($M_1$, $M_2$, $M_3$), 215 is a fixed pattern (P) shown in FIG. 5, 222 is an initial value I of the first register 205, 223-226 are encryption processes executed by the first encryption means 204, 227-230 are exclusive-OR operations executed by the first exclusive-OR operation means 206, and 231 is an identifier created finally. The plain text block ($M_1$, $M_2$, $M_3$) 221 and the fixed pattern (P) are linked. First, the exclusive-OR 227 between the leading n-bit data ($M_1$) of the plain text block 221 and the initial value (I) 222 is computed, and the result is rendered the encryption process 223. Next, the exclusive-OR 228 between that result and the second n-bit data ($M_2$) is computed, and the result is rendered the encryption process 224. The operation is repeated for the third n-bit data ($M_3$) and the fixed pattern (P), thereby obtaining finally the identifier 231. This is a means of creating the identifier by utilization of the CBC mode, and it meets the following conditions of identifier creation means.

(1) The identifier is dependent on all bits of data of the plain text block.

(2) For a plain text m, identifier creation means f, and identifier $a = f(m)$, it is very difficult to obtain x which meets the following.

$$f(m) = f(x)$$

The procedure of creating the identifier described above in connection with FIG. 6 is completely identical to the procedure of data encryption shown in FIG. 5, and it is possible to have the identifier creation process and data encryption process concurrently. Namely, the output of the encryption processes 223-226 in FIG. 6 is sent to the second device 202 as an output (encrypted output of transmission data) of the encryption means 204. Specifically, the output of the encryption process 226, i.e., the identifier 231, in FIG. 6 is the output of the encryption means 204 for the fixed pattern (P) 215 in FIG. 5, and it is stored in the second register 208.

Next, the procedure of verifying the identifier will be described with reference to FIG. 5. First, a processing means (not shown) of the second device 202 replaces the last n-bit data out of the data stored in the restoration block storage means 210 with the fixed pattern 216. In case communication has taken place normally, the original data to be replaced is equal to the fixed pattern 216. Next, the second device 202 uses the second encryption means 211 which performs the same operation as of the first encryption means 204, third register 212 and third exclusive-OR operation means 213 to create comparison data in the same procedure as that of the first device 201 for creating the identifier 231. The comparison data is stored in the third register 212. Finally, the second device 202 uses the comparison means 214 to compare the identifier 231 stored in the second register 208 with the comparison data stored in the third register 212 thereby to verify whether or not the communication data has been tampered.

As described above, the first device 201 on the part of the transmitter uses the same mechanism for the encryption process and identifier creation process, and performs these processes at once, whereby the number of component parts (or the size of program) can be reduced and the processing speed can be enhanced significantly. As regard to the second device 202 on the part of the receiver, although the processing speed cannot be improved, there are many parts shared by the second encryption means 211 and decryption means 207, and therefore the reduction in the number of component parts is possible. Particularly, in case the second device 202 also has transmission, it is inherently equipped with the second encryption means 211, third register 212 and third exclusive-OR operation means 213, and therefore the further reduction in the number of component part is possible.

Embodiment 5

Figure 7:
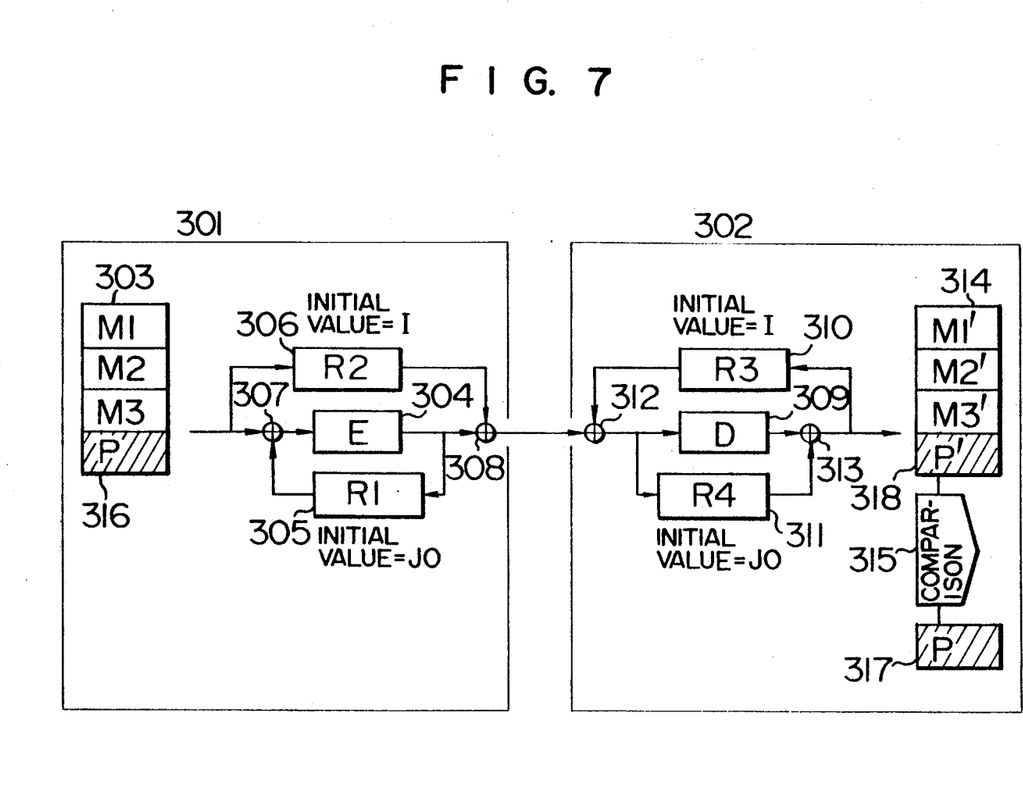

FIG. 7 is a block diagram of the first and second communication means according to another embodiment of this invention. In FIG. 7, 301 is a first device which performs data transmission, and 302 is a second device which performs data reception, and the first device 301 is a terminal and the second device 302 is an IC card in an IC card apparatus, although they will be termed the first and second devices in the following explanation. 303 is a plain text block storage means, 304 is a confidential encryption means which enters n-bit data and delivers n-bit data, 305 is a first register, 306 is a second register, 307 is a first exclusive-OR operation means, 308 is a second exclusive-OR operation means, 309 is a confidential decryption means which corresponds to the first encryption means 304, 310 is a third register, 311 is a fourth register, 312 is a third exclusive-OR operation means, 313 is a fourth exclusive-OR operation means, 314 is a restoration block storage means, 315 is a comparison means, 316 and 317 are an n-bit fixed pattern (P) possessed commonly by the first device 301 and second device 302, and 318 is a comparison data to be compared with the fixed pattern (P) 317. The following Table 1 shows values of data in case communication has taken place normally. In Table 1, symbol "+" denotes the exclusive-OR operation.

TABLE 1

Values of data in the case of normal communication

| First device (transmitter) | | | | Second device (receiver) | | | |
|---|---|---|---|---|---|---|---|
| Plain text | $R_1$ | $R_2$ | Transmission data | Reception data | $R_3$ | $R_4$ | Restored text |
| $M_1$ | $J_0$ | I | $J_1 + I$ | $J_1 + I$ | I | $J_0$ | $M_1$ |
| $M_2$ | $J_1 = E(M_1 + J_0)$ | $M_1$ | $J_2 + M_1$ | $J_2 + M_1$ | $M_1$ | $J_1$ | $M_2$ |
| $M_3$ | $J_2 = E(M_2 + J_1)$ | $M_2$ | $J_3 + M_2$ | $J_3 + M_2$ | $M_2$ | $J_2$ | $M_3$ |
| P | $J_3 = E(M_3 + J_2)$ | $M_3$ | $J_4 + M_3$ | $J_4 + M_3$ | $M_3$ | $J_3$ | P |

Fixed pattern 316

Comparison data 318

The following explains this embodiment in connection with FIG. 7 and Table 1. In the following explanation, symbol "+" denotes the exclusive-OR operation. As the initial state, a same value $J_0$ is stored in the first and fourth registers 305 and 311, and a same value I is stored in the second and third registers 306 and 310. For the $J_0$ and I, random numbers shared confidentially by the first and second communication devices in the first through third embodiments ca be used, for example. The first device 301 divides the plain text block stored in the plain text block storage means 303 into strings of n-bit that is the unit of encryption. The resulting n-bit data strings will be termed $M_1$, $M_2$ and $M_3$ (the fixed pattern (P) 316 will be 15 described later). The leading n-bit data $M_1$ is delivered to the first exclusive-OR operation means 307. The first exclusive-OR operation means 307 computes the exclusive-OR between the n-bit data $M_1$ and the data (initial value $J_0$) in the first register 305, and delivers the result $M_1 + J_0$ to the encryption means 304. The encryption means 304 implements the encryption process for the input $M_1 + J_0$ from the first exclusive-OR operation means 307, and sends the result $J_1 = E(M_1 + J_0)$ to the second exclusive-OR operation means 308. For the encryption key in this operation, a random number shared confidentially by the first and second communication devices in the first through third embodiments can be used, for example. The second exclusive-OR operation means 308 computes the exclusive-OR between the input $J_1$ from the encryption means 304 and the data (initial value I) in the second register 306, and sends the result $J_1 + I$ to the second device 302. Provided that the disorderliness of the encryption means 304 is sufficient, it is very difficult for a third person who does not have the decryption means 307 to obtain the lain text $M_1$ from the communication data (cipher text) $J_1+I=E(M_1+J_0)+I$. In this manner, the implementation of message confidentiality is made possible.

The second device 302 restores the plain text $M_1$ from the reception data (cipher text) in the following manner. The second device 302 uses the third exclusive-OR operation means 312 to compute the exclusive-OR between the received data $J_1+I$ and the data (initial value I) in the third register 310, and delivers the result $(J_1+I)+I=J_1$ to the decryption means 309. The decryption means 309 implements the decryption process for the data $J_1=E(M_1+J_0)$, and delivers the result $M_1+J_0$ to the fourth exclusive-OR operation means 313. The fourth exclusive-OR operation means 313 computes the exclusive-OR between the input $M_1+J_0$ from the decryption means 309 and the data (initial value $J_0$) in the fourth register 311 thereby to restore $(M_1+J_0)+J_0=M_0$ (original plain text), and stores it in the restoration block storage means 314. After that, the first device 301 stores the output $J_1$ of the encryption means 304 in the first register 305 in place of the initial value $J_0$, and stores the plain text $M_1$ in the second register 306 in place of the initial value I. Similarly, the second device 302 stores the output $J_1$ of the third exclusive-OR operation means 312 in the fourth register 311 in place of the initial value $J_0$ and stores the restored data $M_1$ in the third register 310 in place of the initial value I. Accordingly, unless data in transmission is altered accidentally or intentionally, the first register 305 and fourth register 311 and the second register 306 and third register 310 always stores same values. By repeating the process of the leading n-bit data $M_1$ for the $M_2$ and $M_3$ identically, restored original data are stored sequentially in the restoration block storage means 314. This cryptograph-usage mode is a variant of the one known generally as CBC mode. Namely, the transmitter is provided with a feed-forward function in addition to the feedback function of the CBC mode, with the receiver being a symmetrical version thereof, since the content of preceding data affects the encryption output of successive data due to the feedback function possessed by the transmitter, it provides such effectiveness as a different output of the encryption means 304 even for the same transmission data $M_1$, $M_2$ and $M_3$ by changing the initial value $J_0$ of the first register 305. Although this is the inherent feature of the CBC mode, adding the feed-forward function to the transmitter (also adding a feedback function symmetrical to it to the receiver) yields the effectiveness of verifying the message concurrently to decryption, as will be described in detail later.

Figure 8:
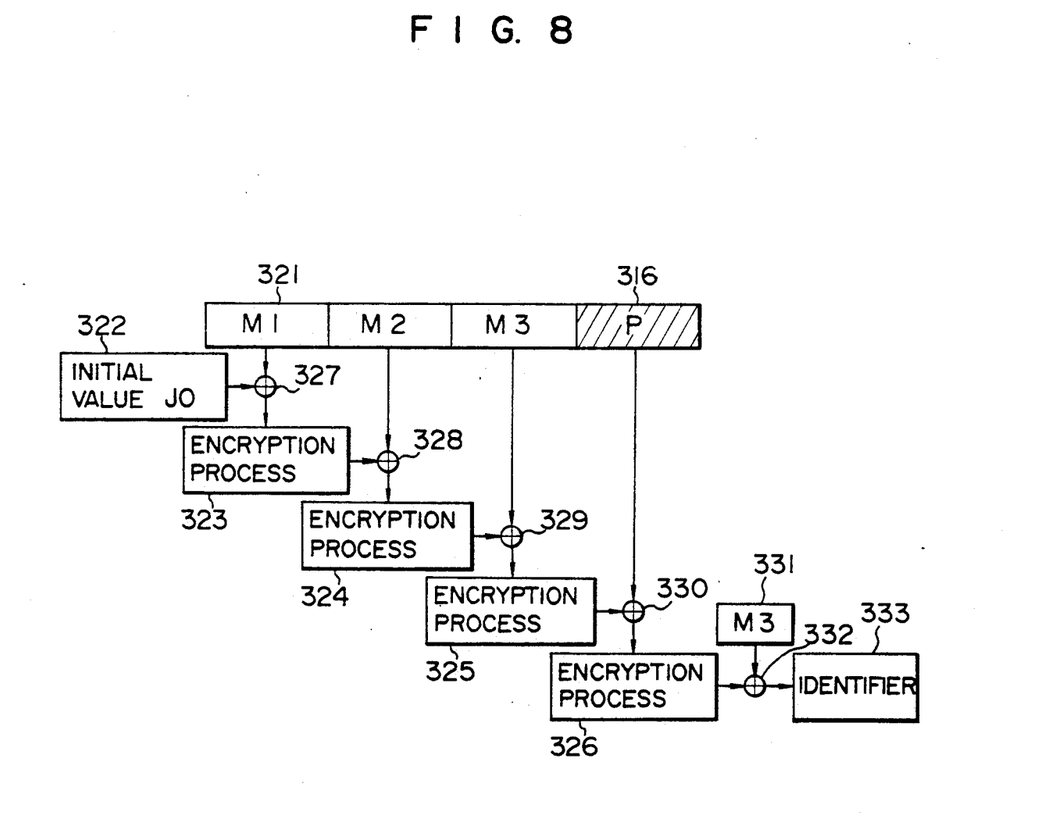

Next, a method of creating the identifier will be explained with reference to FIG. 8. FIG. 8 is an explanatory diagram showing the procedure of creating the identifier, in which 321 is a plain text block ($M_1$, $M_2$, $M_3$), 316 is a fixed pattern (P) shown in FIG. 1, 322 is an initial value $J_0$ of the first register 305, 323-326 are encryption processes executed by the encryption means 304, 327-330 are the exclusive-OR operations executed by the first exclusive-OR operation means 307, 331 is the data $M_3$ stored in the second register 306, 332 is the exclusive-OR operation executed by the second exclusive-OR operation means 308, and 333 is the identifier created finally. The plain text block ($M_1$, $M_2$, $M_3$) 321 and the fixed pattern (P) 316 are linked. First, the exclusive-OR 327 between the leading n-bit data ($M_1$) of the plain text block 321 and the initial value ($J_0$) 322 is computed, and the result is rendered the encryption process 323. Next, the exclusive-OR 328 between that result and the second n-bit data ($M_2$) is computed, and the result is rendered the encryption process 324. The operation is repeated for the third n-bit data ($M_3$) and the fixed pattern (P) and, thereafter, the exclusive-OR 332 between that result and the value ($M_3$) 331 of the second register 306 at that time point is computed, thereby obtaining finally the identifier 333. This is a means of creating the identifier by utilization of the CBC mode, and it meets the following conditions of identifier creation means.

(1) The identifier is dependent on all bits of data of the plain text block.

(2) For a plain text m, identifier creation means f, and identifier $a=f(m)$, it is very difficult to obtain x which meets the following.

$$f(m)=f(x)$$

The procedure of creating the identifier described above in connection with FIG. 8 is completely identical to part of the procedure of data encryption shown in FIG. 7, and it is possible to carry out the identifier creation process and data encryption process concurrently. Namely, the output of the encryption processes 323-326 in FIG. 8 is comparable with the output of the encryption means 304 in FIG. 7, and it is sent to the second device 302 by way of the second exclusive-OR operation means 308. Specifically, the identifier 333 in FIG. 8 becomes the output of the second exclusive-OR operation means 308 for the fixed pattern (P) 316 in FIG. 7.

Finally, a method of verifying the identifier will be explained. As shown in Table 1, in case the communication has taken place normally, the comparison data 318 becomes equal to the fixed pattern (P) 317. Values of data of the case in which data for the plain text $M_2$ on the communication line has been tampered are shown in Table 2. In this case, the restored sentence for the plain text $M_2$ does not match with $M_2$, resulting in a different value of the third register 310 for the next plain text $M_3$ from $M_2$ (in the case of this embodiment, the fourth register 311 also takes a value different from $J_2$). Accordingly, the restored sentence for the plain text $M_3$ does not match with the $M_3$ either. This is the effect of the feedback function possessed by the second device 302 (receiver). Similarly, the restored sentence for the fixed pattern (P) 316 also has its value different from the fixed pattern (P) 316 (i.e., fixed pattern (P) 317). In conclusion, it will be appreciated that by comparing the comparison data 318 with the fixed pattern 317 by the comparison means 315, message verification is possible. Since the comparison data 318 is the final data in the restoration block storage means 314, message restoration and verification can be implemented concurrently.

TABLE 2

Values of data in case data for plain text $M_2$ on the communication line has been tampered

| First device (transmitter) | | | | Second device (receiver) | | | |
|---|---|---|---|---|---|---|---|
| Plain text | $R_1$ | $R_2$ | Transmission data | Reception data | $R_3$ | $R_4$ | Restored text |
| $M_1$ | $J_0$ | I | $J_1 + I$ | $J_1 + I$ | I | $J_0$ | $M_1$ |
| $M_2$ | $J_1 = E(M_1 + J_0)$ | $M_1$ | $J_2 + M_1$ | $J_2 + M_1$ | $M_1$ | $J_1$ | $M_2$ |
| $M_3$ | $J_2 = E(M_2 + J_1)$ | $M_2$ | $J_3 + M_2$ | $J_3 + M_2$ | $M_2$ | $J_2$ | $M_3$ |
| P | $J_3 = E(M_3 + J_2)$ | $M_3$ | $J_4 + M_3$ | $J_4 + M_3$ | $M_3$ | $J_3$ | P |

Fixed pattern 316

Comparison data 318

As described above, the transmitter implements the encryption process and identifier creation process at once with the same mechanism, and the receiver implements the decryption process and identifier verification process at once with the same mechanism, whereby the number of component parts (or the size of program) can be reduced and the processing speed can be enhanced significantly. By using the completely same constituent blocks as of this embodiment, with a modification being made for the input sections of the first through fourth registers 305, 306, 310 and 311, it is possible to offer the encryption process method having the same effectiveness as of this embodiment.

INDUSTRIAL APPLICABILITY

As described above, in this invention, the first communication device is provided with the random number generation means, the first encryption means and the second decryption means, and the second communication device is provided with the first decryption means and the second encryption means, and consequently random numbers created for the confirmation of legitimacy of both parties can be used for the keys of encryption process and decryption process, whereby the faking of the first and second communication devices can be prevented without the need of frequent change of keys and, as a result, correct information exchange can take place between the first and second communication devices.

We claim:

1. A communication apparatus having a first communication device and a second communication device which performs communication with said first communication device, said first communication device comprising first random number generation means which generates a random number, first encryption means which encrypts the random number provided by said first random number generation means, second decryption means which decrypts data entered from said second communication device, data separation means which separates data provided by said second decryption means into first data and second data, third encryption means which encrypts the second data provided by said data separation means, comparison means which compares the random number provided by said first random number generation means with the first data provided by said data separation means, first processing means which performs such data processings as data input/output, storing and operation, and first communication means which processes data provided by said first processing means by using the second data provided by said data separation means and the random number provided by said first random number generation means and thereafter sends it to said second communication device, or receives and processes the data entered from said second communication device by using the second data provided by said data separation means and random number provided by said random number generation means and thereafter delivers it to said first processing means, said second communication device comprising second random number generation means which generates a random number, first decryption means which decrypts encrypted data entered from said first communication device, data linkage means which links the random number provided by said second random number generation means and data provided by said first decryption means, second encryption means which encrypts liked data provided by said data linkage means, third decryption means which decrypts encrypted data entered from said first communication device, a second comparison means which compares the random number provided by said second random number generation means with data provided by said third decryption means, second processing means which performs such data processings as data input/output, storing and operation, and second communication means which processes data provided by said second processing means by using the data provided by said first decryption means and the random number provided by said second random number generation means and thereafter sends it to said first communication device, or receives and processes data entered from said first communication device by using the data provided by said first decryption means and the random number provided by said second random number generation means and thereafter delivers it to said second processing means.

2. A communication apparatus according to claim 1, wherein said random number generation means comprises long-period data generation means which sequentially produces data strings having a long period, a piece of data at a time, and randomizing means which randomizes the output of said long-period data generation means based on a key which is a value native to the first communication device.

3. A communication apparatus according to claim 2, wherein said long-period data generation means comprises nonvolatile storage means.

4. A communication apparatus according to claim 2, wherein at least two means out of the randomizing means, first encryption means, second encryption means and third encryption means comprise same computation means.

5. A communication apparatus according to claim 1, wherein the first communication device or second communication device is an IC card.

6. A communication apparatus having a first communication device and a second communication device which performs communication with said first communication device, said first communication device comprising first encryption means which enters an n-bit plain text and produces an n-bit cipher text, a first register, and first exclusive-OR operation means, said second communication device comprising decryption means which pairs with said first encryption means, a second register, second exclusive-OR operation means, second encryption means which implements a same operation as of said first encryption means, a third register, third exclusive-OR operation means, and comparison means, said first exclusive-OR operation means implementing the exclusive-OR operation for one of a plurality of n-bit data provided by dividing in n-bit units a plain text block and the contents of said first register and delivers it to said first encryption means, said first encryption means implementing a confidential operation for said output from said first exclusive-OR operation means and delivers it to said decryption means, said decryption means implementing a confidential operation for the output from said first encryption means and delivers it to said second exclusive-OR operation means, said second exclusive-OR operation means implementing the exclusive-OR operation for the output from said decryption means and the contents of said second register thereby to produce n-bit restored data, said third exclusive-OR operation means implementing the exclusive-OR operation for said n-bit restored data and the contents of said third register and delivers it to said second encryption means, said second encryption means implementing an operation for the output from said third exclusive-OR operation means.

7. A communication apparatus according to claim 6, wherein the first communication device or second communication device is an IC card.

8. A communication apparatus having a first communication device and a second communication device which performs communication with said first communication device, said first communication device comprising encryption means which enters an n-bit plain text and produces an n-bit cipher text, a first register, a second register, a first exclusive-OR operation means, and a second exclusive-OR operation means, said second communication device comprising decryption means which pairs with said encryption means, a third register, a fourth register, third exclusive-OR operation means, fourth exclusive-OR operation means, and comparison means, said first exclusive-OR operation means implementing the exclusive-OR operation for one of a plurality of n-bit data provided by dividing in n-bit units a plain text block and the contents of said first register and delivers it to said encryption means, said encryption means implementing a confidential operation for the output from said first exclusive-OR operation means and delivers it to said second exclusive-OR operation means, said second exclusive-OR operation means implementing the exclusive-OR operation for the output from said encryption means and the contents of said second register and delivers it to said third exclusive-OR operation means, said third exclusive-OR operation means implementing the exclusive-OR operation for the output from said second exclusive-OR operation means and the contents of said third register and delivers it to said decryption means, said decryption means implementing a confidential operation for the output from said third exclusive-OR operation means and delivers it to said fourth exclusive-OR operation means, said fourth exclusive-OR operation means implementing the exclusive-OR operation for the output from said decryption means and the contents of said fourth register.

9. A communication apparatus according to claim 8, wherein the first communication device or second communication device is an IC card.

* * * * *